United States Patent
Sano

(10) Patent No.: US 7,461,294 B2
(45) Date of Patent: Dec. 2, 2008

(54) INFORMATION PROCESSING APPARATUS, SOFTWARE RENEWAL METHOD FOR THE SAME, PROGRAM CARRIER SIGNAL AND STORAGE MEDIA

(75) Inventor: Kyozo Sano, Kato (JP)

(73) Assignee: Fujitsu Limited, Kawasaki (JP)

( * ) Notice: Subject to any disclaimer, the term of this patent is extended or adjusted under 35 U.S.C. 154(b) by 506 days.

(21) Appl. No.: 11/003,508

(22) Filed: Dec. 6, 2004

(65) Prior Publication Data

US 2006/0075307 A1     Apr. 6, 2006

(30) Foreign Application Priority Data

Sep. 17, 2004   (JP) ............................. 2004-271053

(51) Int. Cl.
*G06F 11/00*   (2006.01)
(52) U.S. Cl. ...................... 714/22; 713/340; 717/173
(58) Field of Classification Search .................. 714/22; 713/340; 717/173
See application file for complete search history.

(56) References Cited

U.S. PATENT DOCUMENTS 7,047,278 B2 *  5/2006  Miyazawa et al. .......... 709/203
7,111,292 B2 *  9/2006  Bonnett et al. .............. 717/171
2005/0138470 A1 *  6/2005  Cromer et al. ................ 714/22

FOREIGN PATENT DOCUMENTS

| JP | 2000311143 A | * | 11/2000 |
| JP | 2002-207599 |   | 7/2002 |
| JP | 2003-87869 |   | 3/2003 |
| JP | 2003087863 A | * | 3/2003 |
| JP | 2003-271464 |   | 9/2003 |

* cited by examiner

*Primary Examiner*—Yolanda L Wilson
(74) *Attorney, Agent, or Firm*—Staas & Halsey LLP

(57) ABSTRACT

An information processing apparatus operating on a finite energy source comprises a remaining power detection unit detecting a remaining electric power of the finite energy source; a determination unit determining a value of electric power of the finite energy source required for completing a renewal replacing a first software with a second software based on the capacity of the aforementioned second software; a judgment unit judging an achievability of renewing the first software by comparing the value of electric power with the remaining electric power; and a deterrent unit deterring a communication of the information processing apparatus with the outside while renewing the first software by replacing it with the second software.

5 Claims, 7 Drawing Sheets

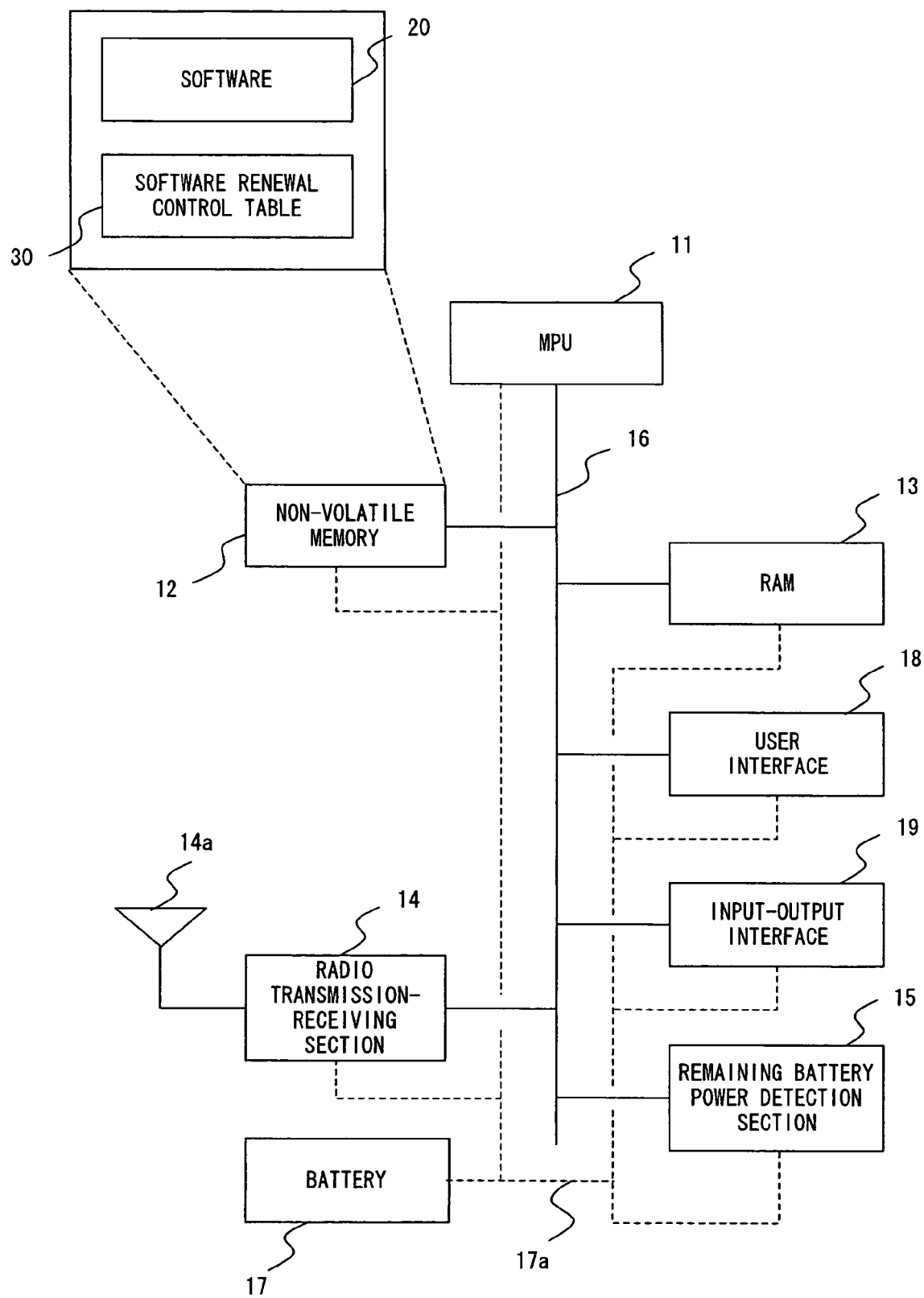
F I G. 1

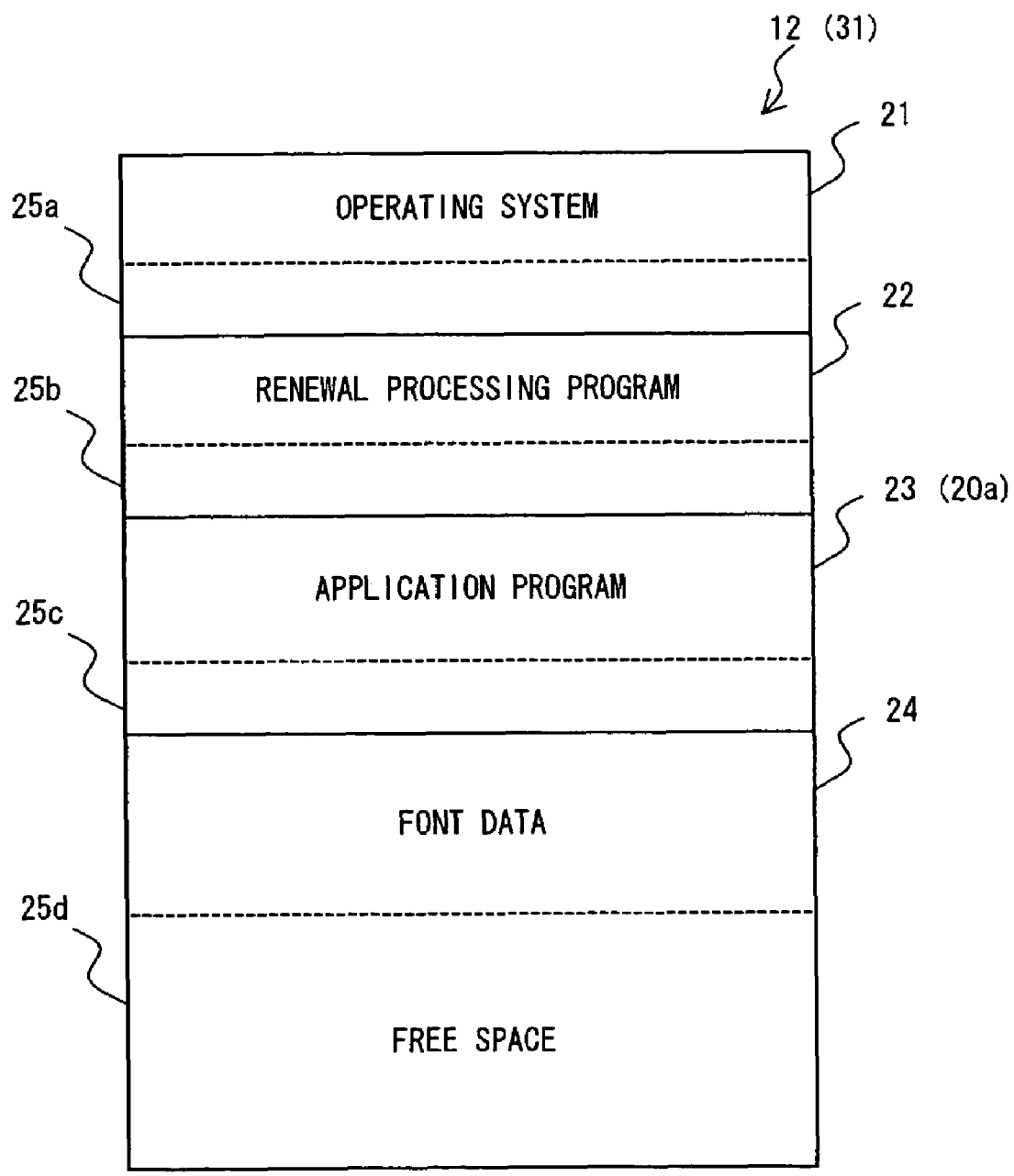
F I G. 2

| STORAGE LOCATION | MEDIA TYPE | STORED SOFTWARE INFORMATION | | COEFFICIENT (V/KB) |
|---|---|---|---|---|
| ROM1 | NOR TYPE FLASH MEMORY | abc, | 400KB | 0.0005 |
| ROM2 | NAND TYPE FLASH MEMORY | egf, | 300KB | 0.0007 |
| AUXILIARY STORAGE | HARD DISK DRIVE | hij, | 800KB | 0.0010 |

FIG. 3

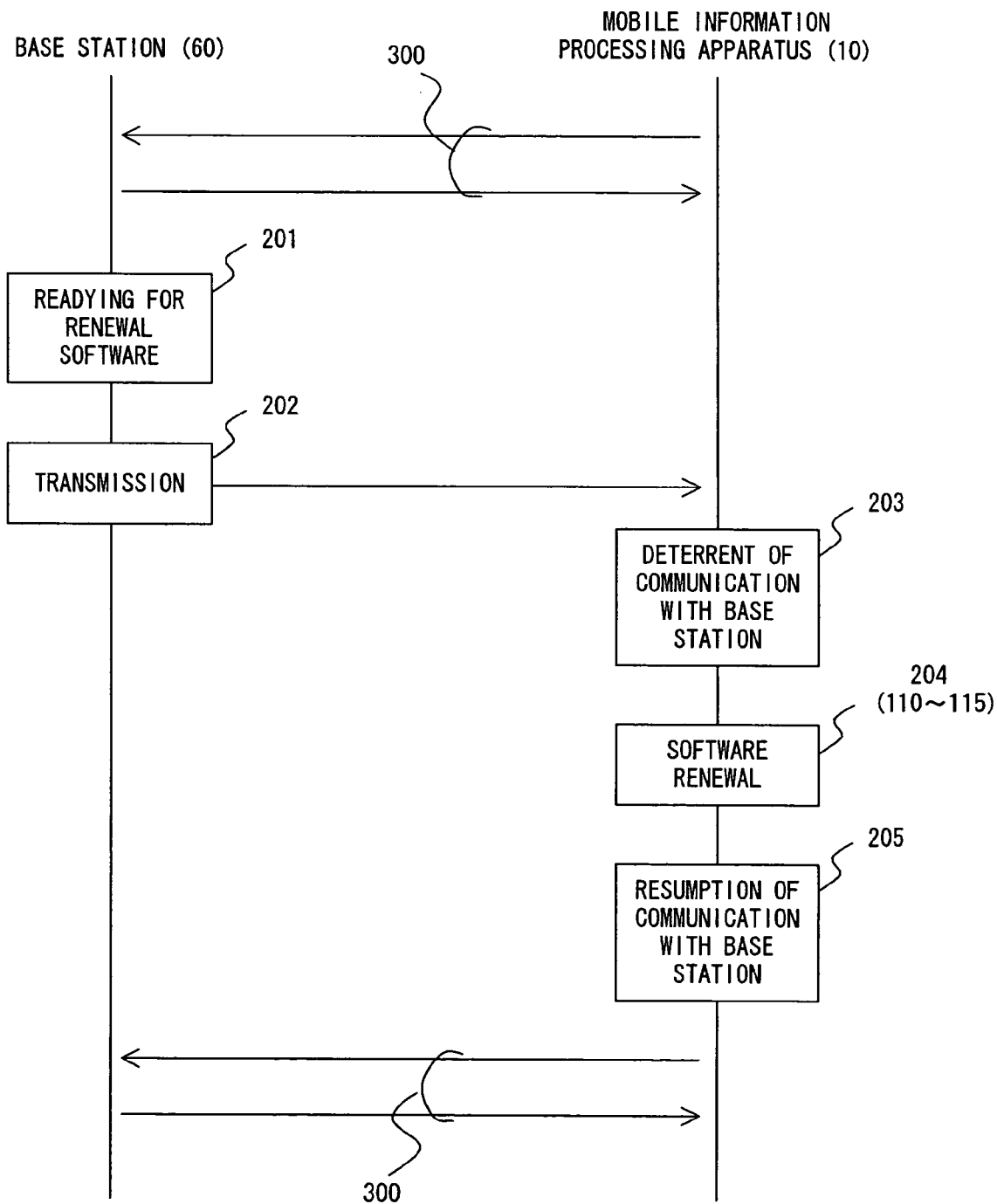
F I G. 6

INFORMATION PROCESSING APPARATUS, SOFTWARE RENEWAL METHOD FOR THE SAME, PROGRAM CARRIER SIGNAL AND STORAGE MEDIA

BACKGROUND OF THE INVENTION

1. Field of the Invention

The present invention relates to an information processing apparatus, a software renewal method for an information processing apparatus and a program carrier signal.

2. Description of the Related Art

Information processing apparatuses such as mobile phones and mobile information processing apparatuses have been widely used in recent years. And software has become increasingly complex in proportion to sophistication of the functions of these information processing apparatuses, hence requiring software renewals in response to defects or version upgrades for functional enhancement after the product shipment.

Accordingly, the conventional software renewals have involved the user operation. Such renewal, however, results in failure if the battery runs out of power, et cetera, during the renewal. And if the software renewal fails, the information processing apparatus cannot be restarted and therefore is unusable in the worst case. Such has been a technological problem.

To this end, for example, a technique has been disclosed by a patent document 1 listed below in which a non-volatile memory is externally added to a mobile phone, a service program to be renewed is temporarily backed up in the non-volatile memory and then the program in the mobile phone is renewed by a downloaded service program. The technique disclosed by the patent document 1, however, requires an auxiliary non-volatile memory for such a backup.

Meanwhile, in the patent document 2 below, a technique has been disclosed in which a remaining battery power and an electrical field level of the receiving terminal, and in addition, the data size are all detected at the time of downloading data to a mobile terminal through a network, and accordingly the downloading is cancelled if these values are below predefined levels. The technique disclosed by the patent document 2, however, is faced with a technological problem of being unable to manage by a finely adjusted response to the downloading data sizes because an availability of downloading is judged by uniform threshold values such as a remaining battery power and an electrical field level of the receiving terminal, and in addition, the data size.

Furthermore in the patent document 3 below, a technique is disclosed in which a memory rewriting apparatus is connected to a mobile phone having no function of self-rewriting data and the data in the mobile phone is renewed by a new version data by the memory rewriting apparatus while the remaining battery power in the mobile phone is being monitored by the apparatus. The technique disclosed by the patent document 3, however, has a problem of requiring such apparatus for a data renewal in addition to the mobile phone.

[Patent document 1] Japanese patent laid-open application publication 2002-207599.

[Patent document 2] Japanese patent laid-open application publication 2003-87863.

[Patent document 3] Japanese patent laid-open application publication 2003-271464.

SUMMARY OF THE INVENTION

The purpose of the present invention is to provide technologies for enabling a simple and accurate software renewal in an information processing apparatus without requiring an auxiliary apparatus, or failing due to a cause such as a depletion of battery power.

Another purpose of the present invention is to provide technologies for enabling a simple and accurate renewal of various sizes of software in an information processing apparatus without failing due to a cause such as a depletion of battery power.

The first aspect of the present invention is to provide an information processing apparatus operating on a finite energy source, comprising: a remaining power detection unit detecting a remaining electric power of the finite energy source; a determination unit determining a value of electric power of the finite energy source required for completing a renewal replacing a first software with a second software based on the capacity of the aforementioned second software; a judgment unit judging an achievability of renewing the first software by comparing the electric power with the remaining electric power; and a deterrent unit deterring a communication of the information processing apparatus with the outside while renewing the first software by replacing it with the second software.

The second aspect of the present invention is to provide an information processing apparatus operating on a finite energy source, comprising:

a remaining power detection unit detecting a remaining electric power of the finite energy source; a record medium storing a first software required for operating the information processing apparatus; a determination unit determining a value of electric power of the finite energy source required for completing a renewal replacing a first software with a second software by corresponding to a type of the record medium; a judgment unit judging an achievability of renewing the first software by comparing the value of electric power with the remaining electric power; and a deterrent unit deterring a communication of the information processing apparatus with the outside while renewing the first software by replacing with the second software.

The third aspect of the present invention is to provide a software renewal method for an information processing apparatus operating on a finite energy source, comprising:

a step in which a second software for renewing a first software installed in the information processing apparatus and a remaining battery power threshold value for distinguishing a remaining electric power in the finite energy source required for completing a renewal replacing a first software with a second software are received by the information processing apparatus from the outside; and a step in which an achievability of completing a renewal replacing the first software with the second software is judged in the information processing apparatus based on the received remaining battery power threshold value, wherein a communication of the information processing apparatus with the outside is deterred while renewing the first software by replacing with the second software.

The fourth aspect of the present invention is to provide a software renewal method for an information processing apparatus operating on a finite energy source, comprising:

a step in which a second software for renewing a first software installed in the information processing apparatus is received from the outside; a step in which a value of electric power of the finite energy source required for completing a renewal replacing a first software with a second software is determined based on the capacity of the aforementioned second software; a step in which a remaining electric power of the finite energy source is detected; and a step in which an achievability of renewing the first software is judged by comparing the value of electric power with the remaining electric power, wherein a communication of the information processing apparatus with the outside is deterred while renewing the first software by replacing with the second software.

The fifth aspect of the present invention is to provide a software renewal method for an information processing apparatus operating on a finite energy source, comprising:

a step in which a second software for renewing a first software installed in the information processing apparatus is received from the outside; a step in which a value of electric power of the finite energy source required for completing a renewal replacing a first software with a second software is determined by corresponding to a type of the record medium storing the first software; a step in which a remaining electric power of the finite energy source is detected; and a step in which an achievability of renewing the first software is judged by comparing the value of electric power with the remaining electric power, wherein a communication of the information processing apparatus with the outside is deterred while renewing the first software by replacing with the second software.

The sixth aspect of the present invention is to provide a program carrier signal controlling an information processing apparatus operating on a finite energy source, making the information processing apparatus execute:

a step in which a second software for renewing a first software installed in the information processing apparatus is received from the outside; a step in which a value of electric power of the finite energy source required for completing a renewal replacing a first software with a second software is determined based on the capacity of the aforementioned second software; a step in which a remaining electric power of the finite energy source is detected; and a step in which an achievability of renewing the first software is judged by comparing the value of electric power with the remaining electric power.

The seventh aspect of the present invention is to provide a program carrier signal controlling an information processing apparatus operating on a finite energy source, making the information processing apparatus execute:

a step in which a second software for renewing a first software installed in the information processing apparatus is received from the outside; a step in which a value of electric power of the finite energy source required for completing a renewal replacing a first software with a second software is determined by corresponding to a type of the record medium storing the first software; a step in which a remaining electric power of the finite energy source is detected; and a step in which an achievability of renewing the first software is judged by comparing the value of electric power with the remaining electric power.

According to the present invention as described above, since the information processing apparatus itself monitors the remaining electric power of the finite energy source such as battery equipped in the aforementioned information processing apparatus, determines a remaining battery power threshold value, for the finite energy source required for completing a renewal replacing the first software with the second software overwriting the former, by corresponding to the capacity of the second software and judges an achievability of the overwriting renewal by comparing the remaining battery power threshold value with the actual remaining power at the time, a failed renewal due to the battery running out of power during the overwriting renewal is certainly prevented, hence achieving an accurate software renewal.

Meanwhile, in the case of receiving the second software from the outside, the information processing apparatus can receive the information on the remaining battery power threshold for overwriting renewal of the second software along with the aforementioned second software, abstract the remaining battery power threshold value and judge an achievability of the overwriting renewal.

Since the judgment of the achievability of the overwriting renewal is done solely by the information processing apparatus, no user involvement is necessary and no additional apparatus is required for the overwriting renewal.

BRIEF DESCRIPTION OF THE DRAWINGS

FIG. 1 illustrates an example configuration of an information processing apparatus according to an embodiment of the present invention;

FIG. 2 illustrates an example configuration of a software configuration in an information processing apparatus according to an embodiment of the present invention;

FIG. 3 illustrates an example configuration of a software renewal control table equipped in an information processing apparatus according to an embodiment of the present invention;

FIG. 6 is a sequence chart showing an example operation of another configuration of an information processing apparatus according to an embodiment of the present invention;

DESCRIPTION OF THE PREFERRED EMBODIMENTS

Figure 4:
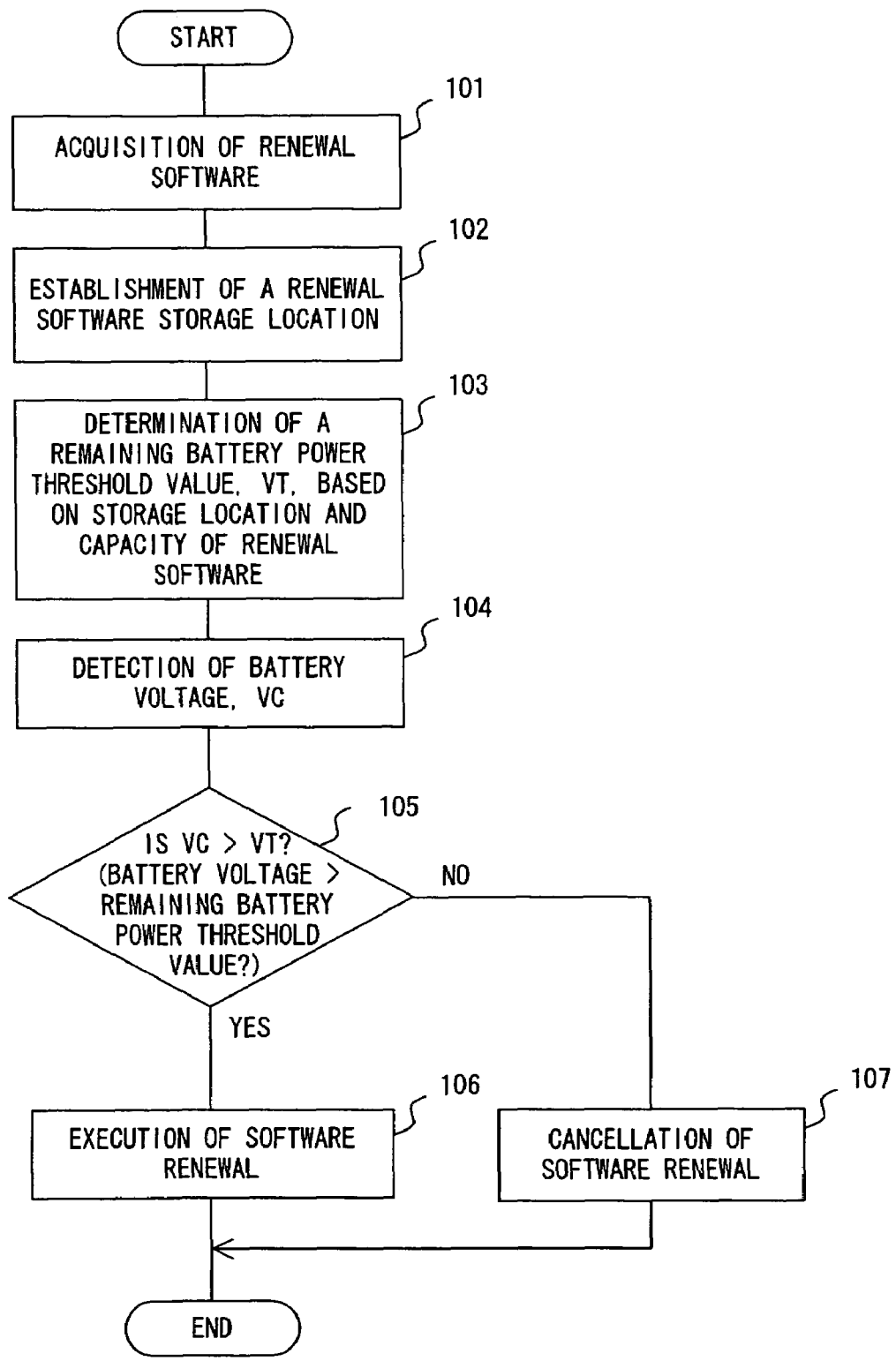
FIG. 4 is a process flow chart showing an example operation of an information processing apparatus according to an embodiment of the present invention.

The embodiment according to the present invention is described in reference to the accompanying drawings as follows.

FIG. 1 illustrates an example configuration of an information processing apparatus according to the embodiment of the present invention.

Note that an information processing apparatus according to the embodiment of the present invention is a concept inclusive of mobile phones, mobile computers, mobile information processing terminals (PDA: Personal Digital Assistance), mobile music/video playing equipment and all other information processing apparatuses.

Also note that the software subjected for renewal in the present embodiment is a concept inclusive of programs, data, font data and other whole information for operating a computer.

As exemplified by FIG. 1, an information processing apparatus 10 of the present embodiment is configured by a computer comprising a microprocessor 11, software 20 such as a program controlling the microprocessor 11 so as to perform control operations as described below, a non-volatile memory 12 (i.e., a record medium) storing the information such as a software renewal control table 30 described below, RAM (Random Access Memory) 13 storing the information such as a program and a data accessed by the microprocessor 11, a radio reception-transmission section 14 receiving data from and transmitting data to the outside by the radio communication by way of an antenna 14a, a remaining battery power detection section 15, a user interface 18, an input-output interface 19 and a bus 16 disposed as an information transfer route interconnecting the above sections.

The non-volatile memory 12 comprises, for example, a non-volatile memory apparatus including a ROM (Read Only Memory) such as a rewritable EEPROM (Electrically Erasable and Programmable Read-Only Memory) and an HDD (Hard Disk Drive).

The user interface 18 comprises, for example, a display providing visible information with the user and a key pad receiving information from the user, et cetera.

The input-output interface 19 comprises, for example, a connector for a wired connection with an external system or a media drive detachably attached by a card type memory media, et cetera.

The information processing apparatus 10 is equipped with a battery 17 (i.e., a finite energy source) supplying operating power to each of the above sections through power supply wires 17a, and the remaining battery power detection section 15 has functions of detecting a remaining power of the battery 17 and giving notice of a detected result to the microprocessor 11.

The battery 17 as a finite energy source is inclusive of, for example, power sources such as a primary battery, a secondary battery, a fuel cell battery, and all other cell type batteries.

It is possible to measure a remaining battery power by a change in the output voltage and current for the primary and secondary batteries, and by a fuel level for the fuel cell battery.

Let the remaining battery power mean, as an example, the voltage difference between a voltage of the battery 17 at an arbitrary point of time and a minimum voltage thereof capable of assuring a stable operation of the information processing apparatus 10 in the case of the present embodiment. The minimum voltage is known by a measurement in advance.

Therefore, the remaining battery power detection section 15 outputs the difference between an output voltage of the battery 17 at the time of measurement and the aforementioned minimum voltage as the remaining battery power.

FIG. 2 illustrates an example configuration of the software 20 installed in the information processing apparatus 10 according to the present embodiment.

The software 20 comprises the information inclusive of an operating system 21, a renewal processing program 22 processing a software renewal as described below, an application program 23 for accomplishing arbitrary business operations, font data 24, et cetera, and is stored in the non-volatile memory 12.

In this case, each of the aforementioned information, i.e., the operating system 21 through the font data 24, is stored in a manner to have one of free spaces 25a, 25b, 25c and 25d, respectively, between the other software storage area so that a later software renewal by a larger capacity thereof is enabled, such as a bug patch and a functional enhancement in the storage area of the non-volatile memory 12.

FIG. 3 illustrates an example configuration of the software renewal control table 30 according to the present embodiment.

In the software renewal control table 30, kinds of information, comprising a storage location 31 for specifying each of non-volatile memories 12 recognized as different kinds of hardware, a media type 32 being information indicating a media type comprising each storage location (i.e., the non-volatile memory 12), storing software information 33 and a coefficient 34 (i.e., K) are stored by being corresponded to each of the storage locations 31.

In the storing software information 33, information such as a name of software (i.e., identification information) and a size of the software stored in the aforementioned storage location 31 is stored.

The coefficient 34 shows an amount of power consumption, i.e., a voltage drop value (V), of the battery 17 per storage capacity (kilobytes in this case) for a renewal writing in the aforementioned storage location 31 (i.e., the non-volatile memory 12). This comprehends a different electric power requirement (i.e., a power consumption of the battery 17) for writing a unit size of data in each of the memory devices (in the storage location 31).

Therefore, a remaining battery power, C multiplied by K (V), can be calculated for writing C kilobytes of data securely in a certain storage location 31.

Note that a single coefficient 34 can be approximately set for using in each model of the information processing apparatus 10, although the coefficient 34 is respectively set for each of the storage locations 31 in the example described above.

An example operation of the present embodiment is then described as follows. FIG. 4 is a process flowchart showing an example operation of the information processing apparatus 10 according to the present embodiment.

To begin with, the operating system 21 stored in the non-volatile memory 12 is loaded onto the RAM 13, resident therein, and executed by the microprocessor 11, thereby controlling the entire operations of the information processing apparatus 10. Meanwhile, the renewal processing program 22, or the application program 23, is loaded from the non-volatile memory 12 to the RAM 13, and executed as required, thereby executing a software renewal processing or a required business processing.

Now, for example, when a renewal of the application program 23 is required for a bug patch or a functional enhancement, the software renewal exemplified by the flow chart in FIG. 4 is accomplished by loading the renewal processing program 22 onto the RAM 13 and by the microprocessor 11 executing the program.

That is, first, renewal software (the latest application program in this case) is obtained either by a downloading through a radio communication with a base station through the radio reception-transmission section 14 or a wired communication with an external system by way of the connector in the input-output interface 19, or by a memory medium such as a memory card by way of the drive in the input-output interface 19, and stored, for example, in a temporary usage area of the RAM 13 or the non-volatile memory 12 (step 101).

Then, the storage location of the renewal software 20a in the non-volatile memory 12 is confirmed (step 102), and a remaining battery power threshold value, Vt, is established by $Vt=C*K$ based on the capacity, C, of the renewal software 20a and the coefficient 34, K, of the storage location 31 where the subject software for renewal is stored, referring to the software renewal control table 30 (step 103). Note that a single coefficient K can be approximately set in the step 103 for using in each model of the information processing apparatus 10 as described above. Alternatively, a remaining battery power threshold value, Vt, can be obtained from a, not-shown, conversion table of capacity-threshold value.

Then, the current voltage value, Vc, of the battery 17 is obtained from the remaining battery power detection section 15 (step 104). Then, if Vc>Vt, a judgment is that it is possible to renew by overwriting the subjected application program 23 with the renewal software 20a (step 105), and therefore a renewal processing is executed in which the subjected application program 23 is overwritten by the renewal software 20a (step 106).

Meanwhile, if Vc≦Vt, in the step 105, a software renewal is cancelled (step 107) because of a possibility of the battery running out of power during the renewal. In this case a screen in the user interface 18 will show a message such as "The software renewal cannot be completed due to a low battery power. Please try again after the battery is recharged."

Meanwhile, for instance in a renewal of an application program 23, if a renewed application program (the renewal software 20a) is of a larger capacity than the total capacity of the current application program and the free space 25c, the font data 24 (with the capacity of C1) behind thereof needs to be moved to the free space 25d, requiring a rewriting associated with this move as well. Therefore, by adding the capacity C1 for moving the font data 24 to the capacity C for the renewal software 20a, the equation vt=(C+C1)*K, for the remaining battery power threshold value in this case.

As such, since the remaining battery power threshold value, Vt, can be set corresponding to the size (i.e., capacity) of the renewal software 20a with no requirement for the user of the information processing apparatus 10 to be conscious of the remaining power of the battery 17 in this embodiment, it is possible to accomplish a quick, simple and accurate renewal of various sizes of the renewal software 20a.

In other words, a conventional technique of judging a remaining battery power and data size by a uniform threshold has caused cases in which a renewal is not possible despite that it is possible to renew a relatively small capacity with the remaining battery power at the point. Contrarily, since the remaining battery power threshold value, Vt, is precisely established corresponding to the capacity of the renewal software 20a in this embodiment, the chance of a renewal being judged to be possible is higher than before, thereby enabling an accurate renewal of various sizes of the renewal software 20a.

Additionally, since no auxiliary apparatus is required besides the information processing apparatus 10 for a renewal by the renewal software 20a, there is also a benefit of using the latest software continuously by achieving software renewals whenever such a situation arises.

As described so far, the present embodiment renders a benefit of certainly avoiding a failed software renewal due to the battery running out of power. This enables a continuous use of the information processing apparatus 10 in the latest, bug-free, high performance software environment by renewing the software 20 continually, quickly, simply and accurately, and an improved performance and convenience of the information processing apparatus 10.

Figure 5:
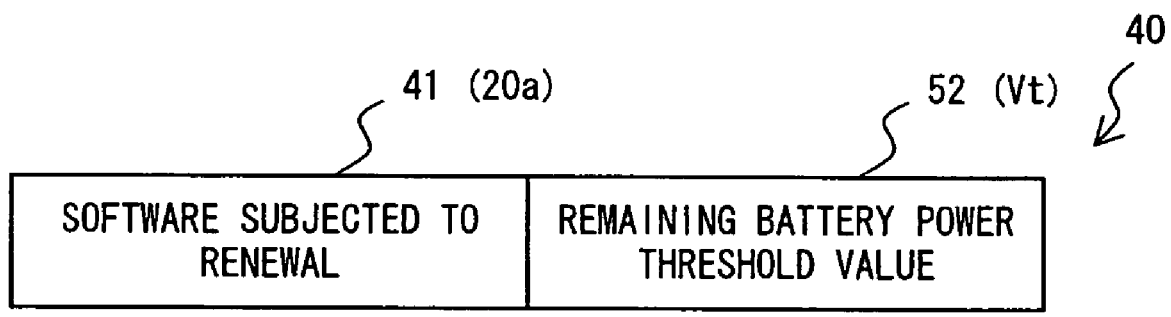
FIG. 5 describes an example operation of another configuration of an information processing apparatus according to an embodiment of the present invention.
Figure 7:
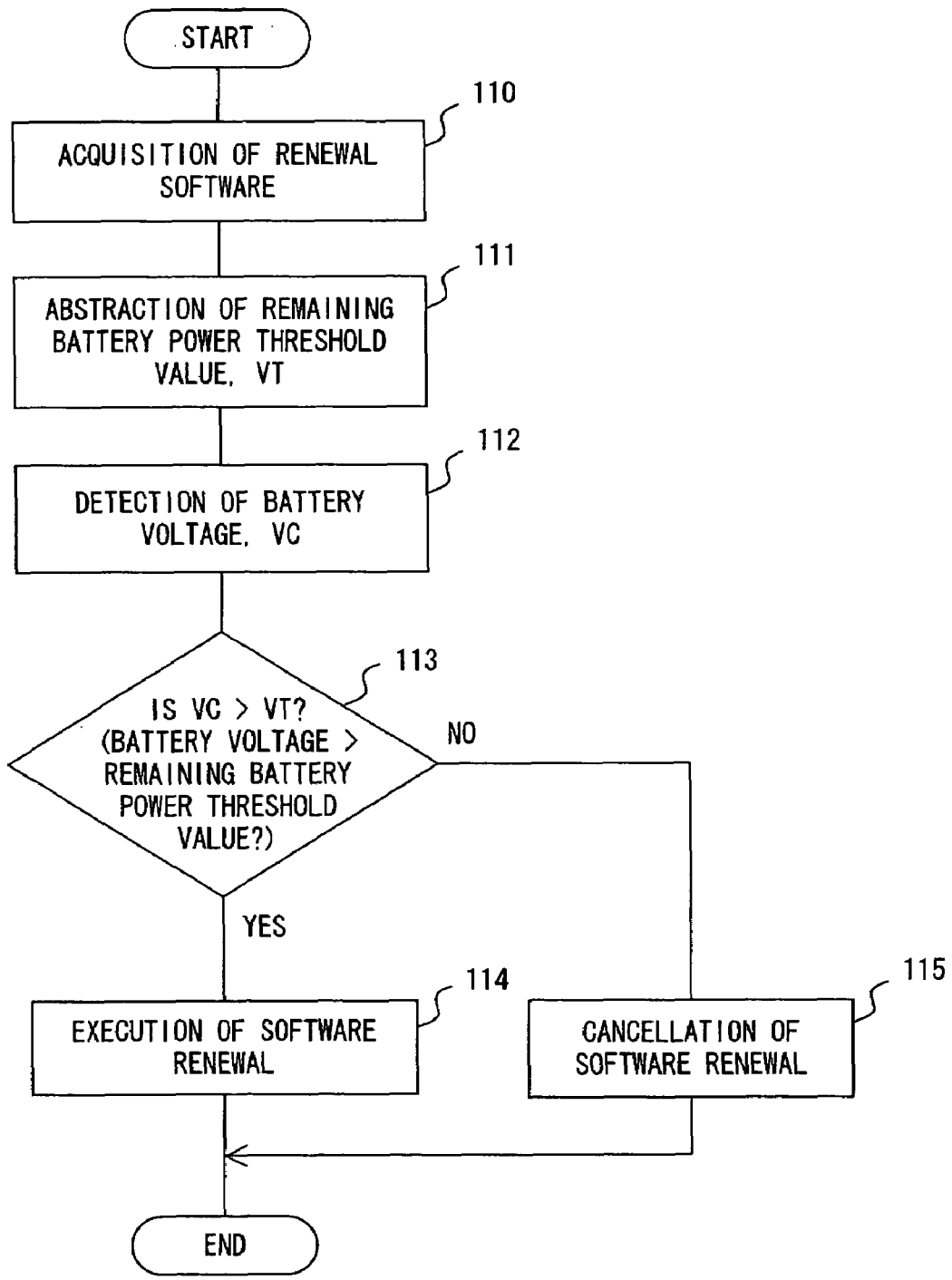
FIG. 7 is a process flowchart showing an example operation of another configuration of an information processing apparatus according to an embodiment of the present invention.

Another example configuration of the information processing apparatus 10 of the present embodiment is then described in reference to FIGS. 5, 6 and 7. In this modified configuration, a downloaded information 40 (i.e., the renewal software 20a) from a base station 60 received by the information processing apparatus 10, for example, includes a remaining battery power threshold value 42 (i.e., a remaining battery power threshold value, Vt) required for judging the achievability of a renewal processing by using the renewal software 41 along with the aforementioned renewal software 41 as exemplified by FIG. 5.

That is, as exemplified by the sequence chart in FIG. 6, the base station 60, when making ready for the renewal software 41, establishes the remaining battery power threshold value 42 and stores (step 201) in a part of the downloaded information 40, and transmits to the information processing apparatus 10 (step 202).

Upon receiving the downloaded information 40, the information processing apparatus 10 stops a series of communications (an area location confirmation communication 300 for the base station locating the information processing apparatus 10, for example) with the base station 60, eliminates the wearing causes of the battery 17 as much as possible (step 203), and then performs a software renewal processing as the flow chart exemplified by FIG. 7 described below (step 204), followed by resuming to the communication with the base station 60 (step 205).

In other words, the downloaded information 40 is first received from the base station 60, the renewal software 41 is obtained from the downloaded information 40 (i.e., a renewal software 20a) (step 110) and the remaining battery power threshold value 42 (i.e., a remaining battery power threshold value, Vt) is obtained (step 111) all by the operation of the renewal processing program 22 in the information processing apparatus 10 as exemplified by the flow chart in FIG. 7.

Then, the present voltage value, Vc, of the battery 17 is obtained in the remaining battery power detection section 15 (step 112), no incidence of running the power out of the battery during the renewal is decided if Vc>Vt (step 113) and the software renewal is started (step 114).

In the meantime, if Vc≦Vt in the step 112, a probability of running the power out of the battery during the renewal is judged and the software renewal is cancelled (step 115).

In the case of the modified configuration, there is no need to equip a function or table for controlling the remaining battery power threshold value, Vt, in the information processing apparatus 10, and therefore the benefit is realized in that a correct software renewal is accomplished while simplifying the software comprisal of the information processing apparatus 10.

In other words, since the software subjected to renewal and the kinds of the storing locations thereof (i.e., the non-volatile memory 12) are relatively limited for each model type in the case of the information processing apparatus 10, it is possible for the base station 60 sending the downloaded information 40 to accomplish a selection and setting of the remaining battery power threshold value, Vt, correctly.

It goes without saying that the present invention is not limited to the exemplified embodiment described above, but can be variously modified within the scope of the idea of the present invention.

The present invention enables the accomplishment of simple and accurate software renewals in an information processing apparatus without a requirement for auxiliary apparatus or a failure due to the battery running out of power, et cetera.

The present invention also enables the accomplishment of simple and accurate software renewals of various capacities in an information processing apparatus without a requirement of auxiliary apparatus or a failure due to the battery running out of power, et cetera.

What is claimed is:

1. An information processing apparatus operating on a finite energy source, comprising:
   a remaining power detection unit detecting a remaining electric power of said finite energy source;
   a determination unit determining a value of electric power of said finite energy source required for completing a renewal replacing a first software with a second software based on the capacity of the aforementioned second software;

a judgment unit judging an achievability of renewing said first software by comparing said value of electric power with said remaining electric power; and a deterrent unit deterring a communication with an outside apparatus while renewing said first software by replacing with said second software, and wherein said electric power is determined based on the sum of capacity of said second software and capacity of other not-replaced first software whose storage location needs to be moved when the capacity of said second software is larger than that of said first software which is existing to be replaced, requiring to move a storage location of the other not-replaced first software for securing a storage space of said second software.

2. An information processing apparatus as in claim 1, further comprising:

an abstraction unit abstracting a value of electric power of said finite energy source required for completing a renewal replacing a first software with a second software.

3. A software renewal method for an information processing apparatus operating on a finite energy source, comprising:

a step in which a second software for renewing a first software installed in said information processing apparatus is received from the outside;

a step in which a value of electric power of said finite energy source required for completing a renewal replacing a first software with a second software is determined based on the capacity of the second software;

a step in which a remaining electric power of said finite energy source is detected; and a step in which an achievability of renewing said first software is judged by comparing said value of electric power with said remaining electric power, wherein a communication with an outside apparatus deterred while renewing said first software by replacing with said second software, and wherein said value of electric power is determined based on the sum of capacity of said second software and capacity of other not-replaced first software whose storage location needs to be moved when the capacity of said second software is larger than that of said first software which is existing to be replaced, requiring to move a storage location of the other not-replaced first software for securing a storage space of said second software.

4. A software renewal method as in claim 3 wherein said step in which a second software for renewing a first software installed in said information processing apparatus is received from the outside comprises receiving a remaining battery power threshold value for distinguishing a remaining electric power in said finite energy source required for completing a renewal replacing a first software with a second software by said information processing apparatus from the outside; and wherein said step in which an achievability of completing a renewal replacing said first software with said second software is judged in said information processing apparatus is based on received said remaining battery power threshold value.

5. A computer program product comprising a computer readable medium having computer readable instructions for:

a step in which a second software for renewing a first software installed in said information processing apparatus is received from an outside apparatus;

a step in which a value of electric power of said finite energy source required for completing a renewal replacing a first software with a second software is determined based on the capacity of the aforementioned second software;

a step in which a remaining electric power of said finite energy source is detected; and a step in which an achievability of renewing said first software is judged by comparing said value of electric power with said remaining electric power, wherein in the step in which said electric power is determined, said value of electric power is determined based on the sum of capacity of said second software and capacity of other not-replaced first software whose storage location needs to be moved when the capacity of said second software is larger than that of said first software to be replaced, requiring to move a storage location of the other not-replaced first software for securing a storage space of said second software.

* * * * *